United States Patent [19]

La Tour

[11] 4,022,916
[45] May 10, 1977

[54] COFFEE-LIKE BEVERAGE AND PROCESS THEREFOR

[75] Inventor: Diane Jean La Tour, Croton Falls, N.Y.

[73] Assignee: General Foods Corporation, White Plains, N.Y.

[22] Filed: Sept. 5, 1975

[21] Appl. No.: 610,609

[52] U.S. Cl. ............................... 426/285; 426/596
[51] Int. Cl.² ....................... A23F 1/00; A23F 1/16
[58] Field of Search .......... 426/285, 594, 595, 596, 426/618, 453, 436

[56] References Cited

UNITED STATES PATENTS

| | | | |
|---|---|---|---|
| 1,177,037 | 3/1916 | Kellogg | 426/190 |
| 1,204,032 | 11/1916 | Kellogg | 426/190 |
| 1,230,184 | 6/1917 | Lorenz | 426/190 |
| 1,349,000 | 8/1920 | Kellogg et al. | 426/205 X |
| 1,765,899 | 6/1930 | Avlon | 426/190 |
| 3,114,641 | 12/1963 | Sperti et al. | 426/206 X |
| 3,458,319 | 7/1969 | Block et al. | 426/285 |
| 3,493,388 | 2/1970 | Hair | 426/453 X |
| 3,554,760 | 1/1971 | Sienkiewicz et al. | 426/453 |
| 3,966,975 | 6/1976 | Hansen et al. | 426/285 |

FOREIGN PATENTS OR APPLICATIONS

| | | | |
|---|---|---|---|
| 567 | 8/1857 | United Kingdom | 426/214 |

*Primary Examiner*—Robert L. Lindsay, Jr.
*Assistant Examiner*—Kenneth M. Schor
*Attorney, Agent, or Firm*—Thomas R. Savoie; Bruno P. Struzzi; Michael J. Quillinan

[57] ABSTRACT

A strong, molasses-type flavor associated with cereal-based coffee-like beverages is eliminated by agglomeration therewith of a minor portion of roasted carob powder.

1 Claim, No Drawings

COFFEE-LIKE BEVERAGE AND PROCESS THEREFOR

BACKGROUND OF THE INVENTION

The typical commercial coffee surrogate is a roasted blend of molasses and/or sucrose and cereal grains such as wheat and/or barley, the molten mixture being heated to the caramelization temperature typically in the neighborhood of 375° F or sightly thereabove to develop flavor. The flavor of this product is characteristicly bitter and acidic. Among many coffee and non-coffee users, this flavor is not preferred. Typically, present coffee substitutes which are in the cold water soluble or hot water soluble form are aqueous extracts of the toasted mixture which are thereafter dried as by vacuum drying during which drying a moderate amount of flavor alteration may also occur incident to dehydration. Such extracts also are characterized by an acidic-bitter principle in beverage flavor.

SUMMARY OF THE INVENTION

It is an object of the present invention to provide a coffee substitute which is distinctive and has coffee-like beverage qualities but is less acid and bitter than coffee or substitutes therefor. A further and more specific object of the invention is to provide a beverage composition which is soluble in either the cold or in hot water and which can be reconstituted into a brew which is more balanced in flavor, more rounded in taste impact and has less acidity.

In accordance with the invention, finely divided roasted carob beans are blended at a minor weight percent with the aforesaid aqueous extract of a coffee substitute under conditions which convert the blend into an agglomerated low density material as by having the aqueous extract dried, ground and agglomerated essentially in accordance with the practice set forth in U.S. Pat. No. 3,554,760 to Sienkiewicz et al., issued Jan. 12, 1971 for Method of Agglomerating Food Powder. The carob seed particles are admixed, for example at a level of one part carob to three parts of dried aqueous extract and charged together to an agglomeration zone wherein the dry extract particles per se are caused to undergo localized wetting and at spaced points of contact are caused to aggregate the carob powder as a dispersed, discontinuous phase in the matrix formed by the agglomerate thus produced. Advantageously, the carob powder particles serve by virtue of their polysaccharidal character in enhancing the bridging and tackification that proceeds during the agglomeration process.

The agglomerate ultimately recovered, for example, at a moisture content of between 3–5.5% ideally may be further dried to the moisture content of 1–3% and as recovered will have a coarse granulation quite like that of present commercial soluble coffee agglomerates which are free-flowing, dark in color with a minimum of fines present, and a maximum of granular appearing surface area.

By virtue of the fusion agglomeration process, the light colored carob particles are discretely dispersed so as to be nonviewable and not detract from the intended dark brown appearance for the product. Agglomeration thus serves to permanently localize the distribution of carob seed particles to provide a uniform beverage impact.

It is a distinct advantage of the present invention that the product, that is the beverage prepared by reconstituting the product, has a sweet, chocolate-like character which is less acidic than more common coffee substitutes. The brew prepared upon reconstitution either with sugar and milk added or without has a more balanced even taste as contrasted with the sharp impact of coffee substitutes roasted to caramelization temperatures.

The flavor base will typically be one resulting from the high temperature controlled caramelization of a polysaccharide such as sucrose, molasses and mixtures thereof with a cereal grain such as pearled barley, wheat or bran and mixtures thereof, the class of cereals and saccharides forming no part of the present invention and, accordingly, all classes of such cereal and sugar mixtures may be so employed. Likewise, the temperatures to which the coffee substitute is elevated and the duration of the heat treatment is not critical and commonly the product will be roasted to some temperature above 375° F for a period exceeding 15 minutes and commonly less than 200 minutes. The ultimate roasted product is then aqueously extracted by percolation in accordance with known accepted methods, and the percolate is dried as by vacuum drying to a moisture content preferably of about 2%.

The carob powder will be ground to that degree of fineness which permits it to be conveniently blended and agglomerated with the aqueous extract, carob powder being present as a minor weight percent of the total soluble solids being admixed, a preferred level being generally less than 45% and typically between 5–40%.

PREFERRED MODE

Roasted carob flour derived from carob pods whose seeds have the locust bean gum mannogalactan content thereof removed are roasted to between 350°–375° F until an intended color is developed and the isobutyric acid content thereof is substantially reduced. This roasting may be carried out over a period of 30 minutes in a common roasting oven. The seeds are then ground to an 80 mesh powder (U.S. Standard Screen Series size).

Separately an extract of cereal and saccharides is produced as follows:

Equal weights soft winter wheat and wheat bran are admixed with molasses at a level of four parts wheat cereal mixture to one part molasses. The ingredients are mixed in a paddle mixer for 20 minutes and steamed whereafter the mixture is roasted to a dark color in approximately 40 minutes and until a moisture content of approximately 2.5% is achieved. This roasted blend is then percolated with hot water or sparge at 190° F minimum typically the percolate being recovered from a percolator column at a temperature, for example, of 205° F and then filtered, clarified and evaporated preparatory to being vacuum drum dried. The dried extract is then ground and sifted to uniform particle size of less than 40 mesh.

Approximately 3 parts of the ground extract to 1 part of the finely divided roasted carob seeds are then uniformly blended and charged to a steam fusion agglomerator of the type set forth in the aforesaid patent, the blend being allowed to be cooled to room temperature preparatory to being charged to the agglomerating zone and the charge being fed to the zone at a steam to powder blend ratio of 1:1. The product is thereupon caused to be deflected and undergo a plurality of collisions incident to which spaced points of contact are brought about in an aggregate which as it descends in free fall through a gravity column or cylindrical chamber undergoes a moisture reduction, for example, to a moisture content of about 3%. Ideally this product will be further dried, for example, to a moisture content of 2%. The agglomerated product will have a bulk density of approximately 0.28 grams per cc; preferably it should range in density between 0.25 and 0.33 grams per cc.

The product thus produced can be readily packaged in customary bottle filling operations and may be consumed at a single teaspoon serving for a cup measure and will provide a pleasant tasting beverage as described hereinabove.

I claim:

1. A process for preparing a coffee-substitute beverage comprising the steps of:
   a. roasting a mixture of a cereal and a polysaccharide at a temperature above 375° F and for a period between 15 and 200 minutes,
   b. aqueously extracting the roasted mixture of step a),
   c. drying the aqueous extract to a moisture content of about 2%,
   d. blending the dried extract with from 5 to 40% finely divided roasted carob seed,
   e. agglomerating the blend of step (d) by means of steam until an agglomerated is produced said agglomerate having a moisture content of between 3 and 5.5% and a bulk density of from 0.25 to 0.33 grams per cc., and
   f. further drying the agglomerate to a moisture content of 1 to 3%.

* * * * *

UNITED STATES PATENT AND TRADEMARK OFFICE
CERTIFICATE OF CORRECTION

PATENT NO. : 4,022,916

DATED : May 10, 1977

INVENTOR(S) : Diane Jean La Tour

It is certified that error appears in the above-identified patent and that said Letters Patent are hereby corrected as shown below:

In column 1, line 16, change "toasted" to -- roasted -- .

In claim 1, line 2 of step (e), change "agglomerated" to -- agglomerate --; after "produced" add a comma.

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*